(12) United States Patent
Re et al.

(10) Patent No.: US 8,944,523 B2
(45) Date of Patent: *Feb. 3, 2015

(54) FLANGED BEARING RING FOR A BEARING UNIT OF A MOTOR VEHICLE WHEEL

(75) Inventors: Paolo Re, Nichelino (IT); Cornelius Petrus Antonius Vissers, Den Dungen (NL)

(73) Assignee: Aktiebolaget SKF, Gothenburg (SE)

( * ) Notice: Subject to any disclaimer, the term of this patent is extended or adjusted under 35 U.S.C. 154(b) by 384 days.

This patent is subject to a terminal disclaimer.

(21) Appl. No.: 13/426,769

(22) Filed: Mar. 22, 2012

(65) Prior Publication Data

US 2012/0248857 A1  Oct. 4, 2012

(30) Foreign Application Priority Data

Mar. 29, 2011 (IT) ................. TO2011A0277

(51) Int. Cl.
| | | |
|---|---|---|
| B60B 27/00 | (2006.01) | |
| F16C 33/64 | (2006.01) | |
| B22D 19/04 | (2006.01) | |
| F16C 33/76 | (2006.01) | |
| F16C 19/18 | (2006.01) | |
| F16C 33/60 | (2006.01) | |

(52) U.S. Cl.
CPC ............ *B60B 27/0005* (2013.01); *B22D 19/04* (2013.01); *B60B 27/0073* (2013.01); *F16C 33/64* (2013.01); *F16C 33/768* (2013.01); *F16C 19/184* (2013.01); *F16C 33/60* (2013.01); *B60B 2360/102* (2013.01); *B60B 2360/104* (2013.01); *B60B 2360/32* (2013.01); *B60B 2900/5114* (2013.01); *B60Y 2200/11* (2013.01); *F16C 2326/02* (2013.01)

USPC .................... 301/109; 384/544; 384/492

(58) Field of Classification Search
CPC ........ F16C 33/60; F16C 33/605; F16C 33/64; F16C 33/72; F16C 33/768; B60B 27/0073; B60B 27/0094
USPC ............ 301/105.1, 109, 110, 110.6; 384/492, 384/515, 544, 564

See application file for complete search history.

(56) References Cited

U.S. PATENT DOCUMENTS 3,583,511 A * 6/1971 Asberg ........................ 180/370
4,715,780 A * 12/1987 Kan ............................. 415/200

(Continued)

FOREIGN PATENT DOCUMENTS

| EP | 0297552 A2 | 1/1989 |
|---|---|---|
| WO | WO2008147284 A1 | 12/2008 |
| WO | WO2010063299 A1 | 6/2010 |

*Primary Examiner* — Kip T Kotter
(74) *Attorney, Agent, or Firm* — Bryan Peckjian; SKF USA Inc. Patent Dept.

(57) ABSTRACT

A flanged bearing ring (10) for the wheel of a motor vehicle includes two different materials joined as a single piece: a tubular core (15) and an outer body (16) around the core. The outer body forms a radial flange (17) and is made of a lighter material than that of the core. At the axially outer end of the ring, at the side where the flange (17) is provided, the interface surfaces between the outer body (16) and the core (15) terminate in a groove (21) formed partly in the outer body and partly in the core. The groove (21) accommodates a sealing ring (22) made of rubber-like or elastomeric material which presses against both the outer body (16) and the core (15) so as to seal continuously, along an entire circumference around the axis (x), a separation line (23) between the core (15) and the outer body (16).

13 Claims, 4 Drawing Sheets

(56) References Cited

U.S. PATENT DOCUMENTS 6,497,515 B1 * 12/2002 Sahashi et al. ................ 384/544
6,971,177 B2 * 12/2005 Ozawa et al. ............ 29/898.062
2003/0210842 A1 * 11/2003 Tajima et al. ................ 384/544
2006/0284475 A1 * 12/2006 Kanehisa et al. .......... 301/110.5
2010/0331093 A1    12/2010 Ozawa et al.

* cited by examiner

US 8,944,523 B2

FLANGED BEARING RING FOR A BEARING UNIT OF A MOTOR VEHICLE WHEEL

CROSS-REFERENCE TO RELATED APPLICATION

This United States Non-Provisional Utility application claims the benefit of Italy Provisional Patent Application Ser. No. TO2011A000277, filed on 29 Mar. 2011, which is incorporated herein in its entirety.

FIELD OF THE INVENTION

The present invention relates to a lightweight, flanged bearing ring for the hub of a motor vehicle wheel, particularly a rotatable ring with a flange providing connection to the wheel and/or the brake rotor.

SUMMARY OF THE INVENTION

The motorcar industry has to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact. Conventional bearing grade steel is still widely used. The raceways are heat treated so as to attain a level of hardness and microstructure homogeneity adequate to withstand the stresses caused by rolling Hertzian contact. Recent flanged bearing rings include a radially inner, annular or tubular insert (or core) made of bearing grade steel and forming one or two raceways, and a radially outer body forming a radially outwardly extending flange around the insert and made of a lightweight material such as aluminium alloy. The lightweight flange is designed to mount the wheel and/or the brake rotor and transfer loads from these components to the tubular insert.

WO 2008/147284 A1 discloses a bearing ring made up of two different materials joined together in a single piece, namely a first, high toughness material such as bearing grade steel forming the raceways and a second, lightweight material, such as a lightweight metal, forming the rest of the ring. The second material is joined to the first material by a semi-solid casting process.

It has been observed that, with bearing rings of the above type, a weak point is given by the area where the interface surface between the two parts of different materials (tubular steel core, outer body of lightweight material) opens on the axially outer side, or outboard side of the bearing. In working conditions, openings along the interface surface between the two different materials tend inevitably to form.

In working conditions, the loads coming from the wheel transmit to the flange of the light-alloy outer body a bending moment which tends to separate the outer body from the core. Furthermore, repeated cycles of thermal stresses cause a differential thermal expansion between the outer body made of aluminium and the steel core, which has a coefficient of thermal expansion lesser than that of aluminium alloys. The infiltration of contaminants such as water, dust, salt, over time causes micro-cracks to broaden and the formation of rust. Experimental tests carried out by the Applicant have shown the occurrence of problems of galvanic corrosion with the use of certain types of light alloy, having a considerable difference in electrochemical potential than the steel. Salt, or even more simply water, can in fact be an electrolytic means having a high capability of penetration in openings. Because of all these factors, there is a risk that the coupling between the outer body of light alloy and steel core deteriorates, resulting in fretting (sliding) and possibly failure of the flanged ring.

It is an object of the invention to provide a bearing ring made of two parts of different materials coupled together in a reliable, long-lasting ad watertight manner, so as to overcome the inconveniences of above-mentioned state of the art.

The above and further objects and advantages are attained, in accordance with the invention, by a flanged bearing ring having the features set forth in claim 1. According to another aspect of the invention, there is proposed a method as defined in claim 9. Preferred embodiments of the invention are defined in the dependent claims.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF THE INVENTION

Figure 1:
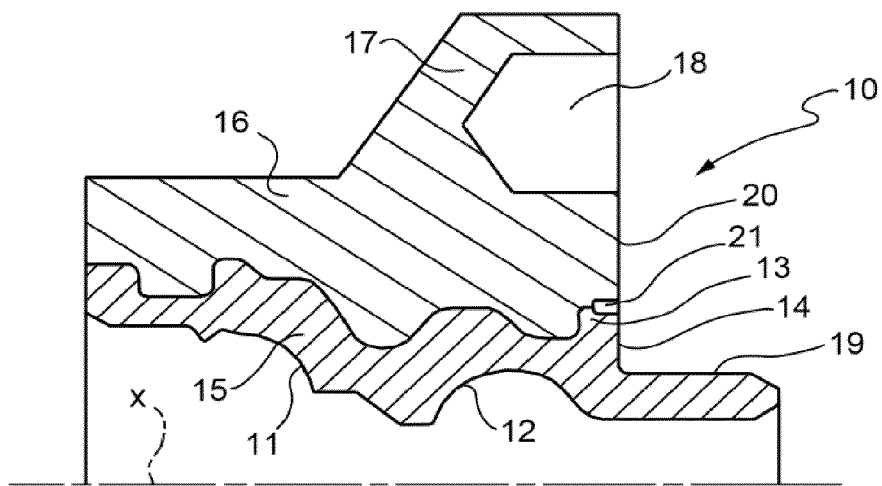
FIG. 1 is an axial cross-sectional view of a first embodiment of a flanged bearing ring according to the invention.

Referring initially to FIG. 1, designated overall at 10 is a flanged bearing ring in accordance with an embodiment of the invention. The ring 10, in this example, is designed to be the outer, rotatable ring of a double-row angular contact ball bearing for vehicle applications, particularly for mounting to a vehicle wheel (not shown) to be rotationally supported relative to a stationary suspension standard (not shown) of the vehicle around a central axis of rotation x. Throughout the present description and the claims, terms and expressions indicating positions and directions such as "radial" and "axial" are understood as referring to the axis of rotation x of the bearing. Expressions such as "axially inner" and "axially outer" instead refer to a condition when mounted on a vehicle.

The ring 10 comprises a radially inner insert or core 15 of a generally tubular shape and a radially outer body 16 providing a radially outwardly extending flange 17 at the outboard side of the core 15. The flange 17 provides a number of bores 18 to allow connection to the vehicle wheel by means of stud bolts (not shown).

The core 15 forms two raceways 11, 12 and is made of a first, hard and tough material, preferably a bearing grade steel. The radially outer body 16 is made of a second, lightweight material. A lightweight metal is preferred, such as aluminium, magnesium, or alloys thereof. Other suitable materials for the outer body may include, but not be limited to, carbon composites or reinforced polymers. In order to provide adequate structural support to the outer body 16, the steel core 15 extends axially through the whole width of the outer body, from the inboard to the outboard side. The tubular core 15 forms an axial tubular extension or spigot 19 at its outboard side, which facilitates centering of the vehicle wheel. The spigot 19 protrudes axially from a radially outer surface 20 of the flange 17, facing an axially outer direction.

The outer body 16 is formed around the core 15 in a number of different ways, for example through a semi-solid casting process, or by sintering or casting, or die-casting. At the end of any of these processes, the lightweight material tightly copies the shape of the radially outboard surface of core 15, whereby the inner and outer bodies interlock with one another. The shape of the radially outboard surface of the core 15 is so formed as to provide a series of grooves and ridges which extend in the circumferential direction and determine the formation of complementary ridges and grooves in the outer body when this is formed around the core.

Towards the axially inner ends, the core 15 forms a ridge 13 which projects in a radially outer direction and extends in a circumferential direction. The ridge 13 serves as a shoulder to oppose relative axial displacement between the outer body 16 and the core 15. The ridge 13 provides an axially outer radial surface 14 which is coplanar, or substantially coplanar, with the axially outer surface 20 of flange 17; the surface 20 defines a precise reference surface against which the wheel or brake disc will rest.

At the axially outer end ring, at the outboard side where the flange 17 is provided, the interface surface between the outer body and the core ends in a groove 21 formed partly by the outer body 16 and partly by the inner core 15. It is noted that the interface surface terminates in a position which is recessed with respect to the axially inner radial surfaces 20 of the flange 17 and 14 of the ridge 13.

The groove 21, which opens in an axially outer direction, may be obtained by turning in a terminal step of the manufacturing process of the ring, that is, after the outer body 16 has already been formed around the core 15. As an alternative, the groove 21 may be produced during the same manufacturing step in which the outer body is formed around the core, for example by means of an annular insert placed in the moulding cavity.

Accommodated in the groove 21 is an annular gasket 22 of rubber or elastomeric material which exerts a hermetic sealing action both against the outer body 16 and the core 15. Therefore, the annular gasket 22 continuously covers and closes, along an entire circumference around the axis x, a separation line 23 between the steel of the core 15 and the lightweight metal of the outer body 16, where the interface surface between these two materials meets the outboard side of the ring 10.

Figure 2:
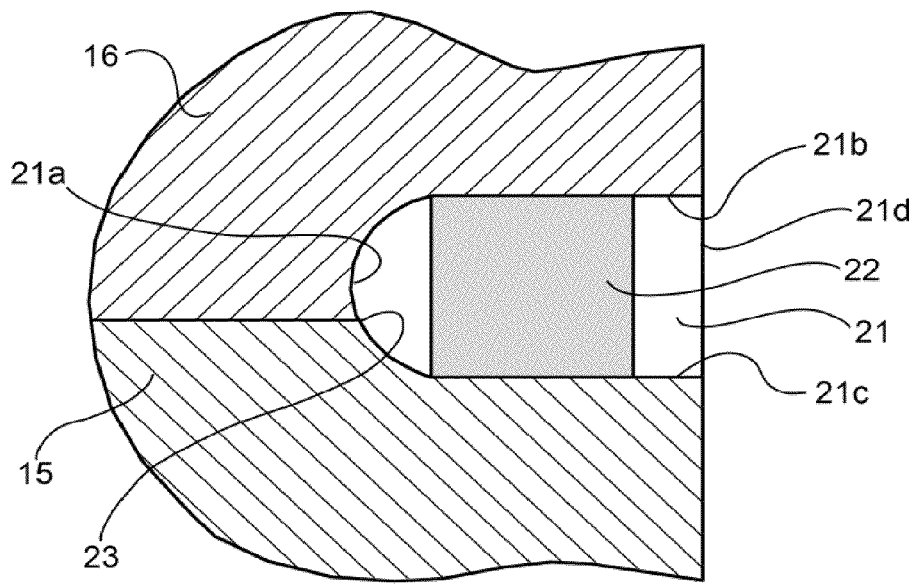
FIG. 2 is an enlarged view of a detail of FIG. 1 with an annular gasket mounted in a groove of the ring.

Preferably, as shown in the enlargement of FIG. 2, the groove 21 is obtained to a greater extent in the outer body of lightweight metal 16, and to a lesser extent in the ridge 13 of the core 15. Due to this arrangement, a minor quantity of the material (steel) that provides the greatest contribution in terms of structural strength is removed, and therefore the ridge 13 is not weaken to an appreciable extent.

Figure 3:
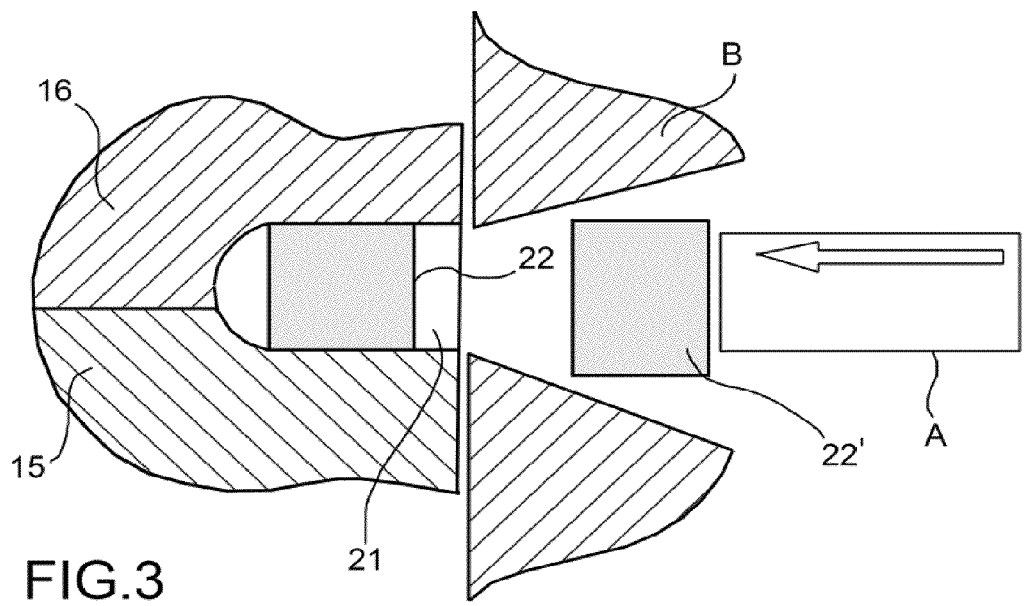
FIG. 3 shows the insertion of the gasket of FIG. 2 in the bearing ring of FIG. 1.
Figure 4:
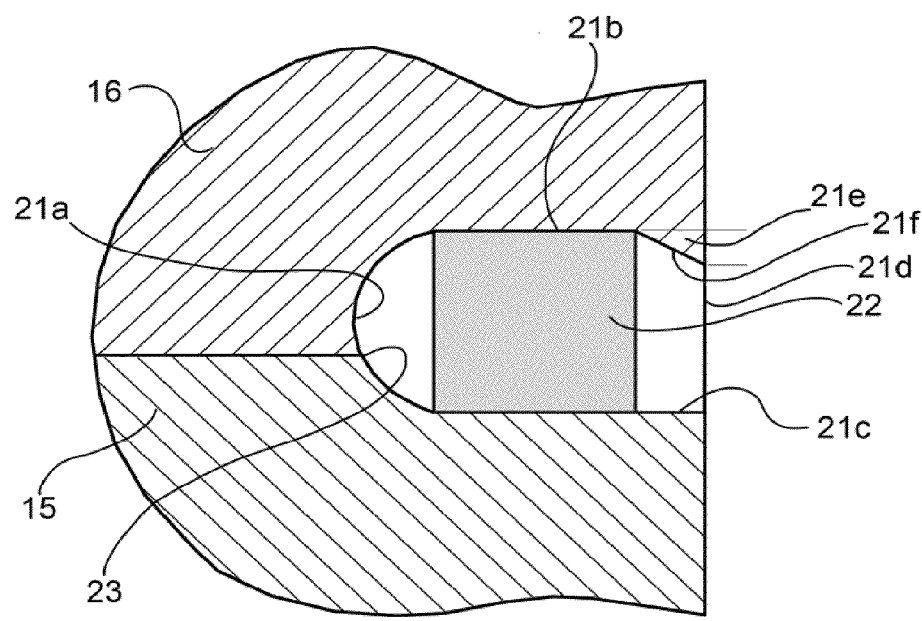
FIG. 4 is a view, similar to that of FIG. 2, showing a variant of the shape of the groove.
Figure 5:
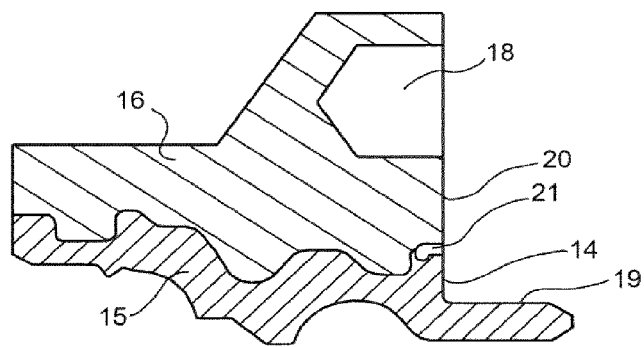
FIG. 5 is a view, similar to that of FIG. 1, showing a ring with a groove of different shape.
Figure 6:
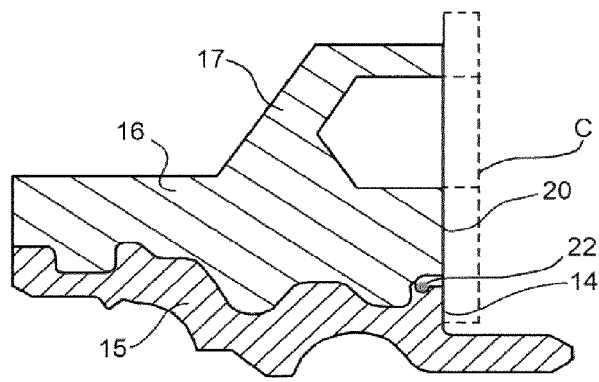
FIG. 6 shows the ring of FIG. 5 with a gasket mounted in the groove.
Figure 7:
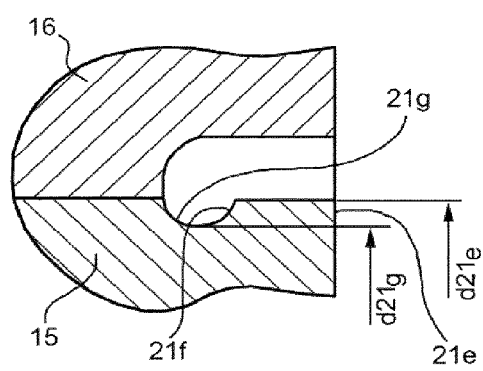
FIG. 7 shows an enlarged view of the groove of the ring of FIGS. 5 and 6.
Figure 8:
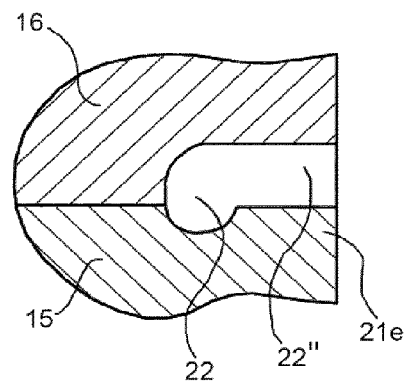
FIG. 8 shows a gasket, in the mounted condition and immediately prior to its insertion into the groove.

In the embodiment illustrated in FIG. 3, the groove 21 has a rounded bottom 21a and two coaxial cylindrical surfaces 21b, 21c between which the gasket 22 is forcefully inserted, for example by means of a punch A and a guide B, so that the gasket, once inserted in the groove, remains trapped in it in a radially compressed condition with respect to its undeformed condition 22' prior to the assembly. In the embodiment of FIG. 4, the opening 21d of the groove 21 has a radial dimension smaller than the radial distance between the coaxial cylindrical surfaces 21b, 21c, in order to retain the gasket within the groove and prevent it from accidentally coming out of the groove. Preferably, the narrowing of the opening 21d is achieved by creating an edge 21e protruding in a radial direction from the outer body 16 toward the core 15. Alternatively, the edge 21e can be formed as an edge protruding from the core 15 towards the outer body 16. The creation of a conical surface 21f, tapered in an axially inner direction, i.e. away from the opening 21d, opposes the escape of the gasket from the groove and helps the gasket 22 to reach its correct working position when it is inserted in the groove.

FIGS. 5 to 9 show further variants with annular seals 22 of circular cross-section. The presence of an edge 21e at the opening 21d of the groove keeps the annular gasket spaced from the brake disc (indicated in dashed lines at C in FIG. 6). As shown for example in FIG. 7, the projecting edge 21f has a diameter d21f greater than the diameter d21g of the axially inner end of the groove, where a rounded portion 21g having a radius corresponding to the radius of the transversal cross-section of the gasket. In all variants of the invention, it is possible to use a gasket which has, in its free or undeformed condition, a smaller diameter than that of the groove in which the gasket is mounted. The gasket (FIG. 8) should be elastically enlarged (as indicated schematically at 22") in order to get over the edge 21e and then shrink steadily in its seat after being fitted deep in the groove. The tapered surface 21f, which is concave in this example, favors the retaining of the gasket in the groove 21.

Figure 9:
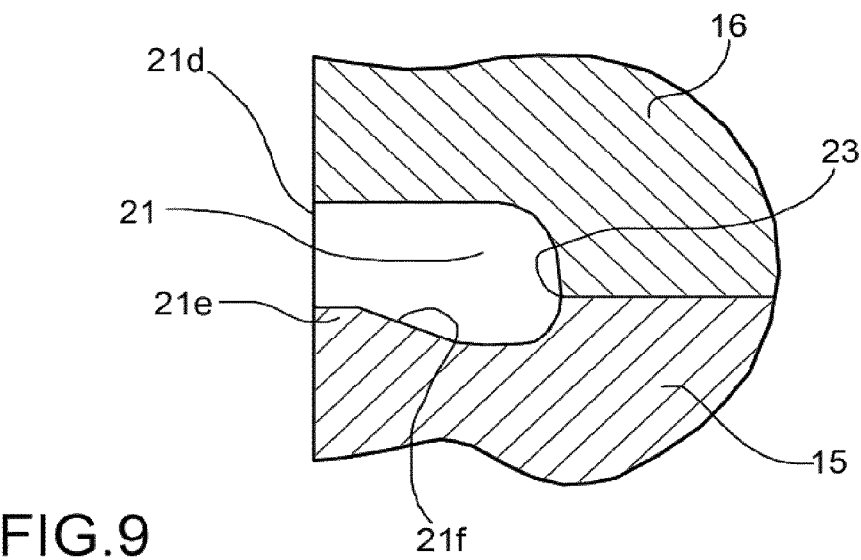
FIG. 9 is a view, similar to FIG. 7, of a further variant of the shape of the groove.
Figure 10:
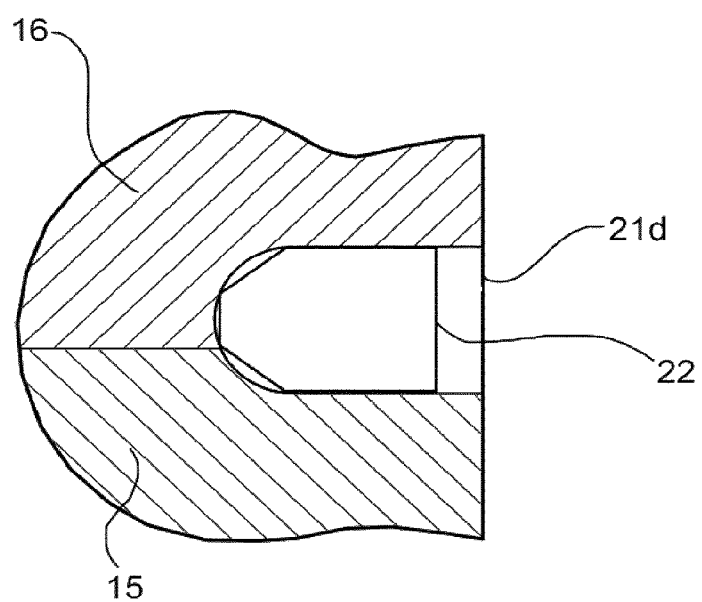
FIG. 10 shows a further variant of the shape of the gasket.

Preferably, the annular gasket 22 does not project axially beyond the flat surface defined by the surfaces 20 and 14, but only partly fills the groove 21. Owing to this arrangement, the brake disk C does not contact the gasket 22, and therefore rests only against the flat surfaces 20 and 14. Otherwise, in case the gasket 22 should protrude axially beyond the surfaces 14 and 20, it could cause planarity errors of the braking surfaces of the brake disc. In addition, the absence of contact between the gasket and the brake disc prevents the drawback that the warm brake disc may melt the elastomeric or rubber material and tear it out of its seat when removing the brake disc for servicing. Those skilled in the art will readily recognize that many variants and combinations can be made with respect to the embodiments herein described and illustrated. For example, FIG. 9 shows a variant with a tapered surface 21f and a rounded seat to receive a gasket of circular cross-section. In FIG. 10, the gasket 22 has two bevels to facilitate its insertion into the groove.

Not necessarily the bottom of the groove 21 must have a rounded profile as shown. A rounded shape is preferable if one chooses to make a groove with thin dimensions, using a thin turning tool having a rounded head.

We claim:
1. A flanged bearing ring for a motor vehicle wheel, the flanged bearing ring including two different materials joined together as a single piece, the flanged bearing ring comprising:
   a radially inner tubular or annular core which forms at least one raceway around a central axis of rotation, the radially inner tubular or annular core providing a radially outer surface and being made of a first material having a high toughness; and
   a radially outer body which is formed around the radially outer surface of the radially inner tubular or annular core, the radially outer body forming a radially outwardly extending flange and is made of a second material being lighter than the first material, wherein at an axially outer end of the flanged bearing ring where the flange is provided, interface surfaces between the radially outer body and the radially inner tubular or annular core terminate in a groove which is formed partly in the radially outer body and partly in the radially inner tubular or annular core, and that accommodated in the groove is an annular sealing gasket of rubber-like or elastomeric material which is pressed against both the radially outer body and the radially inner tubular or annular core so as to seal continuously, along an entire circumference around the central axis of rotation, a separation line at the axially outer end of the interface surfaces between the radially inner tubular or annular core and the radially outer body.

2. The flanged bearing ring according to claim 1, wherein the groove opens in an axially outward direction forming an annular opening bounded by a rim which is formed by at least one of the radially outer body and the radially inner tubular or annular core and projects radially towards the other of the radially inner tubular or annular core and the radially outer body.

3. The flanged bearing ring according to claim 2, wherein the rim is formed by the radially inner tubular or annular core and protrudes in a radially outward direction.

4. The flanged bearing ring according to claim 3, wherein the groove has a tapered surface tapering in an axially outer direction towards the annular gap of the groove.

5. The flanged bearing ring according to claim 4, wherein the tapered surface is conical.

6. The flanged bearing ring according to claim 3, wherein the annular sealing gasket has, in a free or undeformed condition, a diameter which is less than a maximum diameter of the rim.

7. The flanged bearing ring according to claim 1, wherein the annular sealing gasket is elastically compressed in a radial direction between two coaxial cylindrical surfaces of the groove, wherein the two coaxial cylindrical surfaces of the groove are obtained in the radially outer body and in the radially inner tubular or annular core, respectively.

8. The flanged bearing ring according to claim 7, wherein an annular gap of the groove has a radial width which is less than the radial distance between the two coaxial cylindrical surfaces of the groove.

9. The flanged bearing ring according to claim 1, wherein part of the groove formed in the radially inner tubular or annular core is obtained in a ridge or shoulder which protrudes in a radially outer direction and extends in a circumferential direction.

10. The flanged bearing ring according to claim 9, wherein the groove is obtained for its majority in the radially outer body, and to a lesser extent in a crest of the radially inner tubular or annular core.

11. A flanged bearing ring according to claim 9, wherein the ridge or shoulder has an axially outer radial surface coplanar or substantially coplanar with an axially outer, radial surface of the flange, the groove separates the axially outer radial surface of the ridge or shoulder and the axially outer, radial surface of the flange, and that the sealing gasket only partially fills the groove without projecting axially beyond a radial plane in which the axially outer, radial surface of the flange lies.

12. The flanged bearing ring according to claim 1, wherein the annular sealing gasket is entirely axially recessed with respect to a radial plane in which an axially outer radial surface of the flange lies.

13. The flanged bearing ring according to claim 1, wherein the annular sealing gasket has, in a free or undeformed condition, a diameter which is less than a minimum diameter of the groove.

* * * * *